(12) United States Patent
Ladd

(10) Patent No.: US 6,543,720 B2
(45) Date of Patent: Apr. 8, 2003

(54) DIRECTIONAL CONTROL AND AEROFOIL SYSTEM FOR AIRCRAFT

(76) Inventor: Paul Vincent Ladd, P.O. Box 341 Newport Beach, Sydney N.S.W. 2106 (AU)

( * ) Notice: Subject to any disclaimer, the term of this patent is extended or adjusted under 35 U.S.C. 154(b) by 21 days.

(21) Appl. No.: 09/826,877

(22) Filed: Apr. 6, 2001

(65) Prior Publication Data

US 2002/0047069 A1 Apr. 25, 2002

(30) Foreign Application Priority Data

Oct. 13, 1999 (WO) .............................. PCT/AU99/00874

(51) Int. Cl.⁷ ................................................ B64C 5/10
(52) U.S. Cl. ........................................ 244/89; 244/45 R
(58) Field of Search ............................... 244/3.24, 3.27, 244/3.28, 3.29, 4 R, 34 R, 35 R, 45 A, 45 R, 7 C, 49, 89

(56) References Cited

U.S. PATENT DOCUMENTS

| 4,598,888 A | * | 7/1986 | Beteille ..................... 244/178 |
| 5,645,249 A | * | 7/1997 | Hein ........................... 244/49 |
| 6,089,503 A | * | 7/2000 | Volk ............................. 244/48 |
| 6,247,666 B1 | * | 6/2001 | Baker et al. ................ 244/3.21 |
| 6,315,240 B1 | * | 11/2001 | Rasmussen et al. ........ 244/3.24 |

* cited by examiner

Primary Examiner—Peter M. Poon
Assistant Examiner—T. D. Collins

(57) ABSTRACT

An aircraft is disclosed. The aircraft has a canard control surface 25 and an aft control surface 10. The canard control surface comprises an integral aerofoil which in its entirety pivots about a first axis of rotation 28. The canard control surface has a center of lift p which is rearward of the first axis. The aft control surface is rearward of the canard control surface and comprises an integral aerofoil which in its entirety pivots about a second axis of rotation 13. The aft control surface having a center of lift P which is rearward of the first axis. The canard control surface and the aft control surface act in unison to produce a directional change in the aircraft.

8 Claims, 19 Drawing Sheets

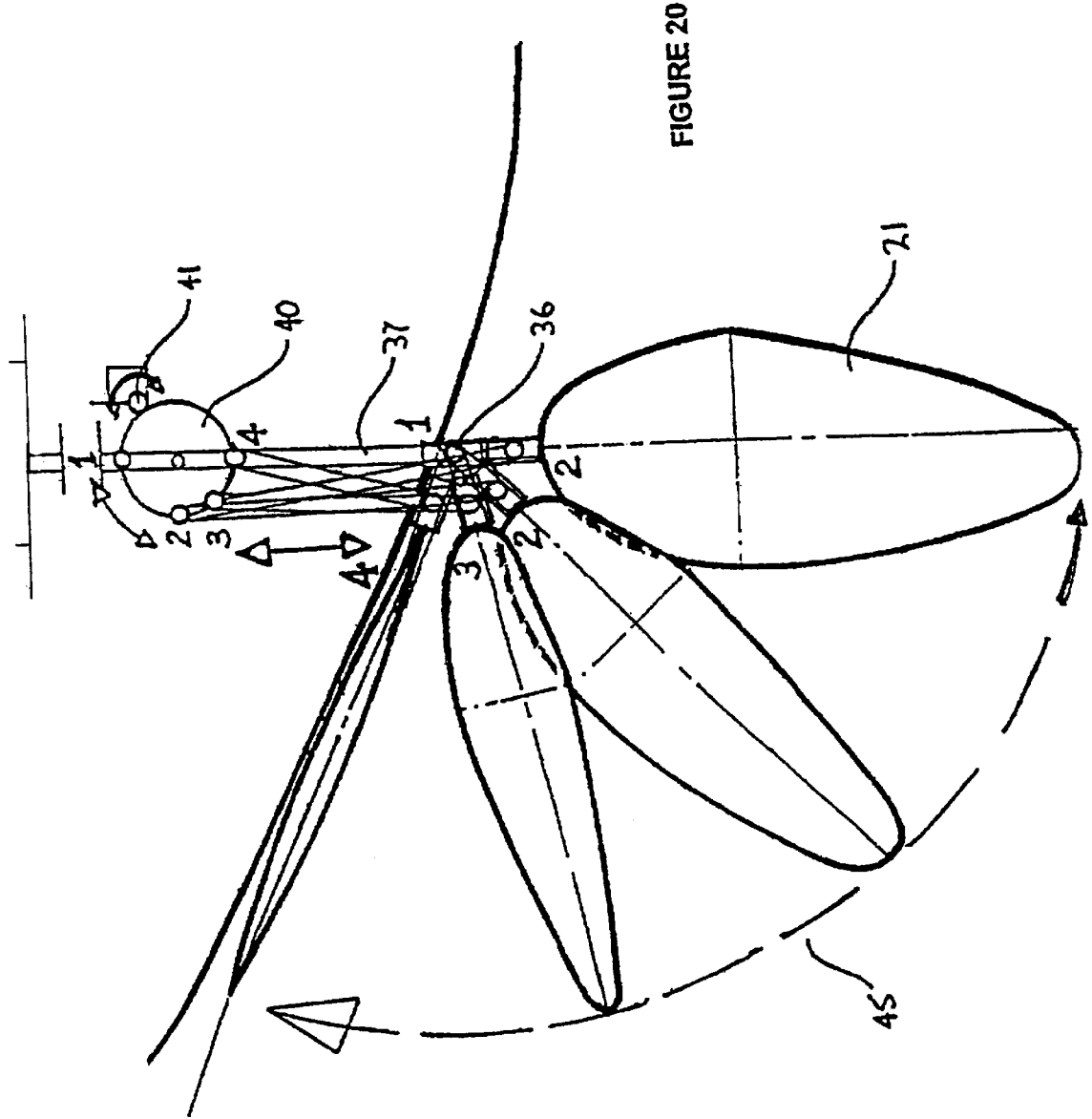

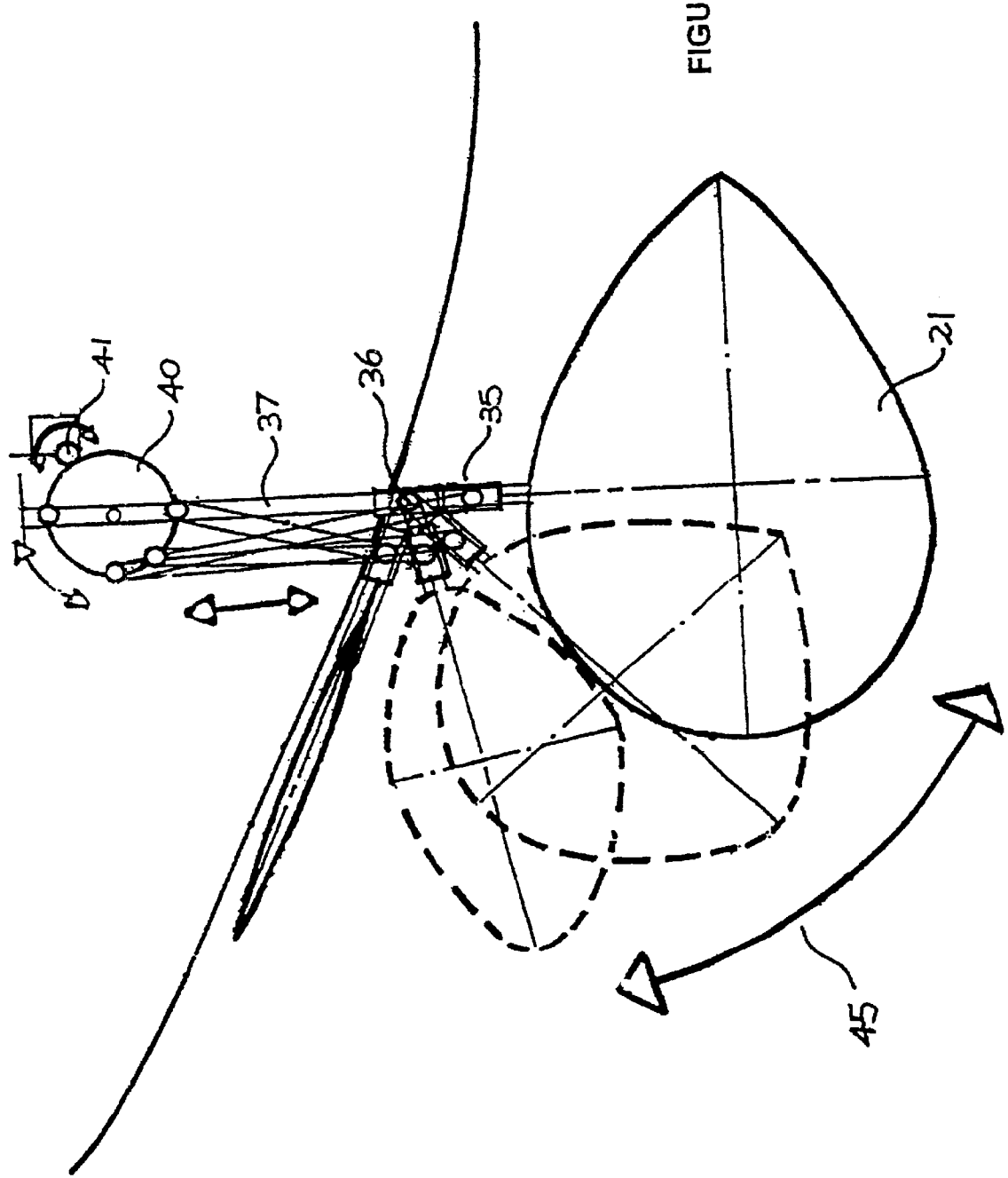

DIRECTIONAL CONTROL AND AEROFOIL SYSTEM FOR AIRCRAFT

FIELD OF THE INVENTION

The present invention relates to aircraft, and more particularly to the directional stability and control of aircraft.

The invention has been developed primarily for use in relation to commercial passenger aircraft, and will be described hereinafter with reference to this application. It will be appreciated, however, that the invention is not limited to this particular field of use, being also applicable to a wide variety of other aircraft including military, as well as smaller recreational aircraft.

BACKGROUND OF THE INVENTION

With the increasing importance of air travel as a mode of global transportation, and in an increasingly competitive global market, there is a growing need to optimise the performance potential of commercial aircraft in a number of areas including manoeuvrability, speed, load carrying capacity, fuel efficiency, and comfort. The same factors in general terms are equally relevant to military and recreational craft.

Most conventional aircraft include wings and a tail assembly which act in conjunction with the elongate fuselage to provide lift, directional stability and control. More specifically, the wings of an aircraft typically include ailerons to control rotation about the roll axis and flaps to control lift as well as pitch. The tail assembly typically includes a horizontally oriented stabiliser or tail plane with elevators to control rotation about the pitch axis and a vertically oriented fin supporting a movable rudder to control rotation about the yaw axis. The structure and operation of these lift and control surfaces are well known to those skilled in the art, and so will not be described in further detail.

One significant limitation inherent in these conventional aerodynamic structures is that acceleration beyond certain critical limits, for example during sharp turning manoeuvres, can cause one or more of the lift or control surfaces to stall. This can also occur during relatively low speed manoeuvres, particularly take-offs and landings, where in order to generate sufficient lift, the control surfaces are presented to the incident air stream at a relatively steep angle of attack. When a stall condition is induced, the air flow around the stalled lift or control surface, which is normally smooth and streamlined, delaminates and breaks into unstable turbulence. This in turn causes the efficiency of the aerofoil surface to be dramatically reduced. This results in a loss of manoeuvrability, increased power requirements to maintain momentum, and increased fuel consumption. In some cases, the minimum degree of lift and control necessary for stable flight cannot be maintained during a stall. This has potentially catastrophic consequences.

Another disadvantage with conventional control surfaces is that they are not able to respond sufficiently quickly to changes in air density, pressure, currents and the like to counteract the turbulent effect on the aircraft as it moves rapidly through these changing atmospheric conditions. The result is buffeting and discomfort for the passengers and crew within the craft. While the problem can be overcome to some extent using computer controlled automatic pilots with rapid response times, the effect is not eliminated entirely.

A further disadvantage with conventional lift and control surfaces is that because of the propensity to stall, the general lack of responsiveness, and the practical limit to structural strength, modern aircraft lack manoeuvrability, particularly at relatively high speed.

DISCLOSURE OF THE INVENTION

It is an object of the present invention to overcome or ameliorate one or more of the disadvantages of the prior art, or at least to provide a useful alternative.

A control system for an aircraft, said control system including:

an aerofoil surface;

mounting means connecting the aerofoil surface to the aircraft for rotation about an axis generally normal to a longitudinal axis of the aircraft such that the effective centre of pressure of the aerofoil surface is spaced rearwardly from its axis of rotation; and bias means operable to urge the aerofoil surface toward a central rest position while permitting limited rotational movement of the control surface away from the central rest position in response to unbalanced pressure loadings whereby unbalanced aerodynamic pressures acting on the aerofoil surface tend automatically to effect a corresponding rotation against a restoring force provided by the bias means By virtue of this arrangement, unbalanced aerodynamic pressures acting on the aerofoil tend automatically to effect a corresponding rotation against a restoring force provided by the bias means. It is believed that this increases manoeuvrability and delays the onset of a stall condition which would otherwise result in a dramatic reduction in the efficiency and effectiveness of the aerofoil.

The aerofoil according to one aspect of the invention preferably takes the form of a control surface. The control surface may be oriented vertically, horizontally or at any intermediate angle, and as such may be configured to operate during manoeuvres involving roll, pitch or yaw.

In one preferred embodiment, the control surface includes a rudder optionally supported by a fin. In another embodiment, the control surface includes a stabiliser or tail plane, optionally fitted with elevators. A combination of both configurations is also contemplated.

In one essential embodiment, conventional control surfaces adapted to initiate directional changes are provided in the form of canard lift surfaces or wings and canard rudders, disposed toward the front of the aircraft, while control surfaces according to the present invention are integrated into the tail assembly toward the rear of the aircraft, to complement the aerodynamic response of the forward directional control surfaces.

In another essential form, the invention is embodied to include the primary lifting aerofoil of the aircraft wherein the aerofoil surface forms the separate primary wings.

Here, the lateral control aerofoils according to the invention are preferably formed integrally with the primary lift aerofoils or wings of the aircraft, and as such may be disposed substantially further forward on the fuselage from the tail assembly.

BRIEF DESCRIPTION OF THE DRAWINGS

Preferred embodiments of the invention will now be described, by way of example only, with reference to the accompanying drawings in which:

FIG. 20 is an enlarged diagrammatic view of one of the lower control surfaces of the aircraft of FIGS. 18 and 19, showing one embodiment of a retraction mechanism.

FIG. 20A shows a variation of the arrangement shown in FIG. 20;

PREFERRED EMBODIMENTS OF THE INVENTION

Figure 1:
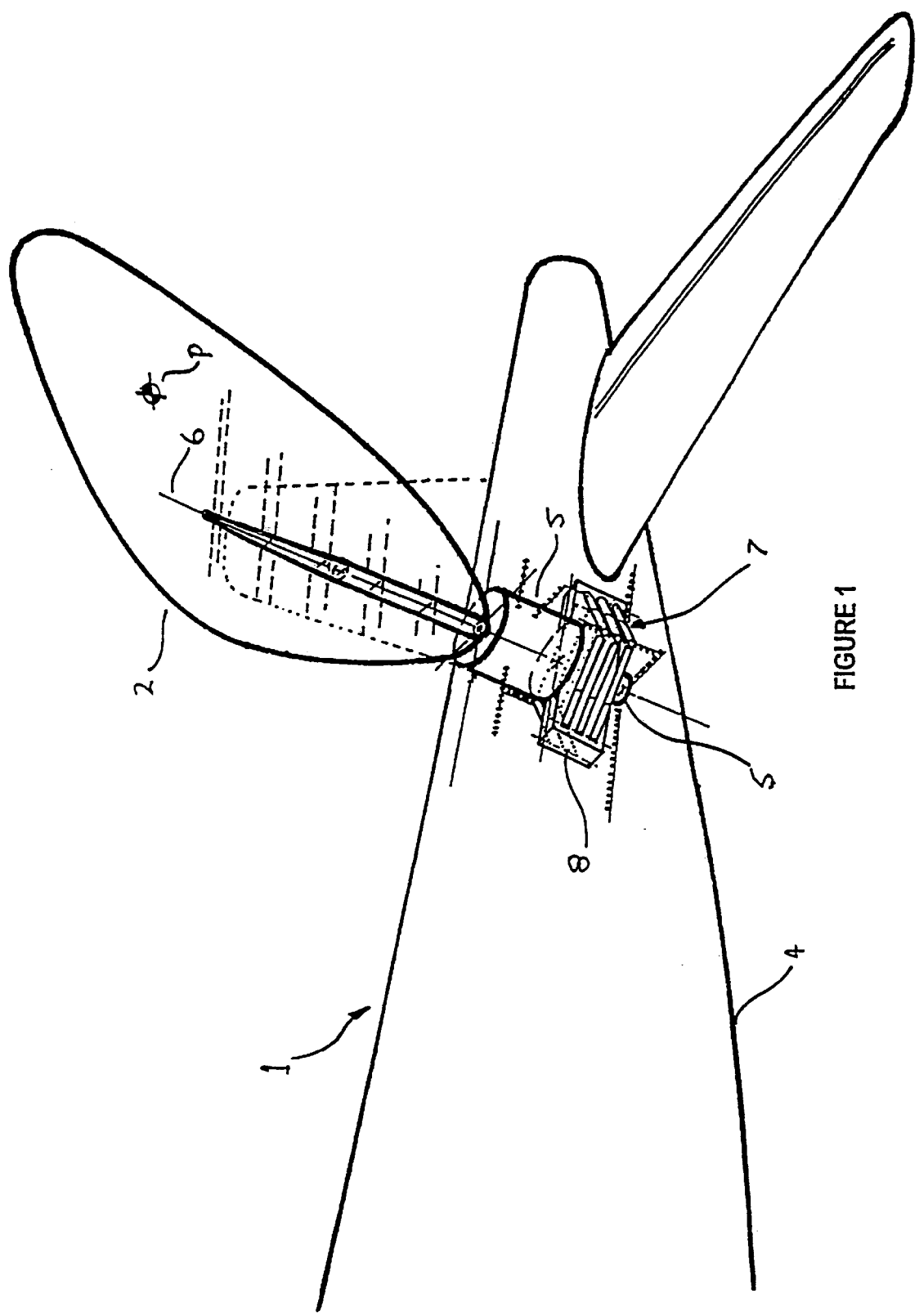
FIG. 1 is a diagrammatic perspective view showing part of the tail section of a fixed wing aircraft, wherein a conventional fin and rudder assembly has been replaced by a vertically oriented control surface, according to a first embodiment of the invention.
Figure 1A:
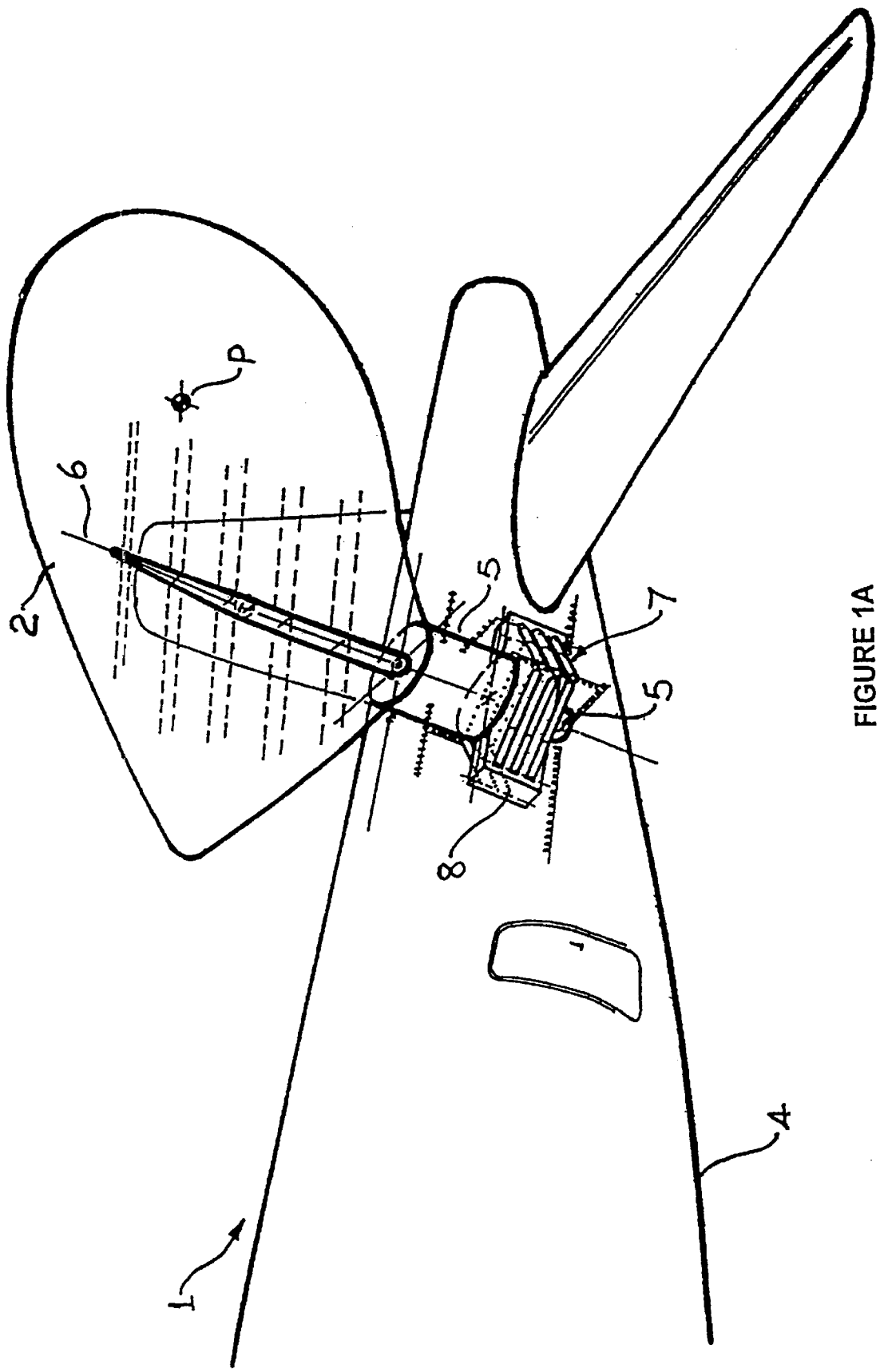
FIG. 1A shows a variation of the arrangement shown in FIG. 1.

Referring initially to FIG. 1, the invention provides a control system for an aircraft 1. The control system includes one primary aerofoil in the form of a control surface 2. In FIG. 1, the control surface 2 is a vertically oriented aerofoil aligned with the longitudinal axis of the aircraft fuselage 4. The control surface 2, in this case taking the place of a conventional fin and rudder assembly, is supported by means of bearings 5 for rotation about a vertical axis 6. The rotational axis 6 is generally perpendicular to the longitudinal axis of the aircraft.

Resilient bias means 7, represented diagrammatically as a spring box or battery 8, urges the control surface 2 toward a central rest position which is aligned with the longitudinal axis of the aircraft, as shown. The spring bias mechanism is, however, adapted to permit a limited degree of rotational movement of the control surface 2 away from the central rest position, in response to unbalanced aerodynamic pressure loadings, as will be described in more detail below. Although the bias mechanism is represented diagrammatically as an arrangement of springs, it will be appreciated that alternative biasing means such as hydraulic, pneumatic, or electric actuators, could also be used in conjunction with computerised controllers to produce the desired aerodynamic or system response.

It should be noted that the effective centre of pressure of the control surface, indicated as point P, is spaced rearwardly from the axis of rotation 6. In this configuration, unbalanced reaction pressures acting on the control surface tend automatically to effect a corresponding rotation against a restoring force provided by the spring bias mechanism.

Figure 2:
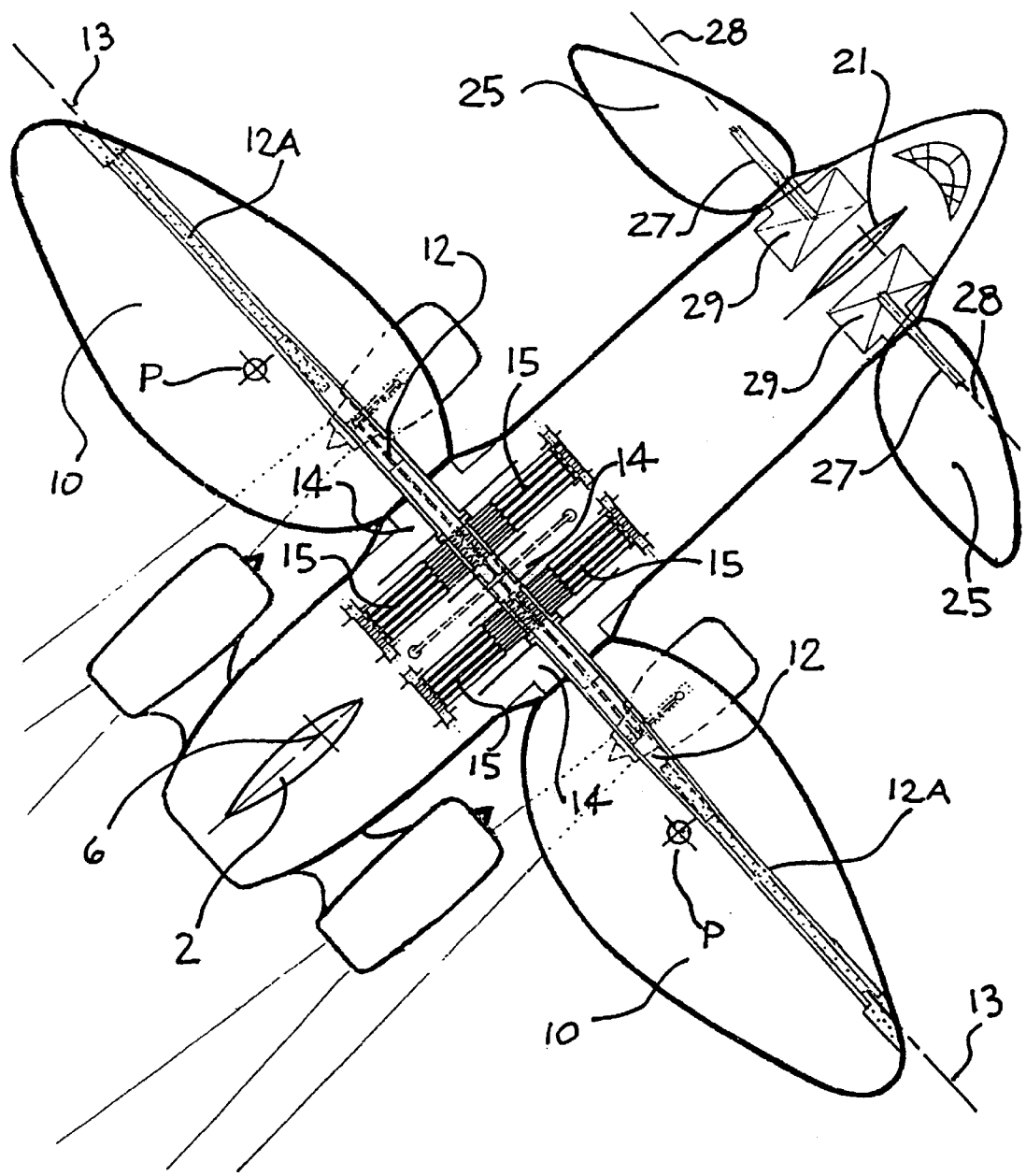
FIG. 2 is a diagrammatic plan view of an aircraft according to a second embodiment of the invention, wherein conventional wings have been replaced by horizontally oriented control surfaces and integral lifting surfaces according to the invention for operation in conjunction with forwardly disposed canard wings.
Figure 2A:
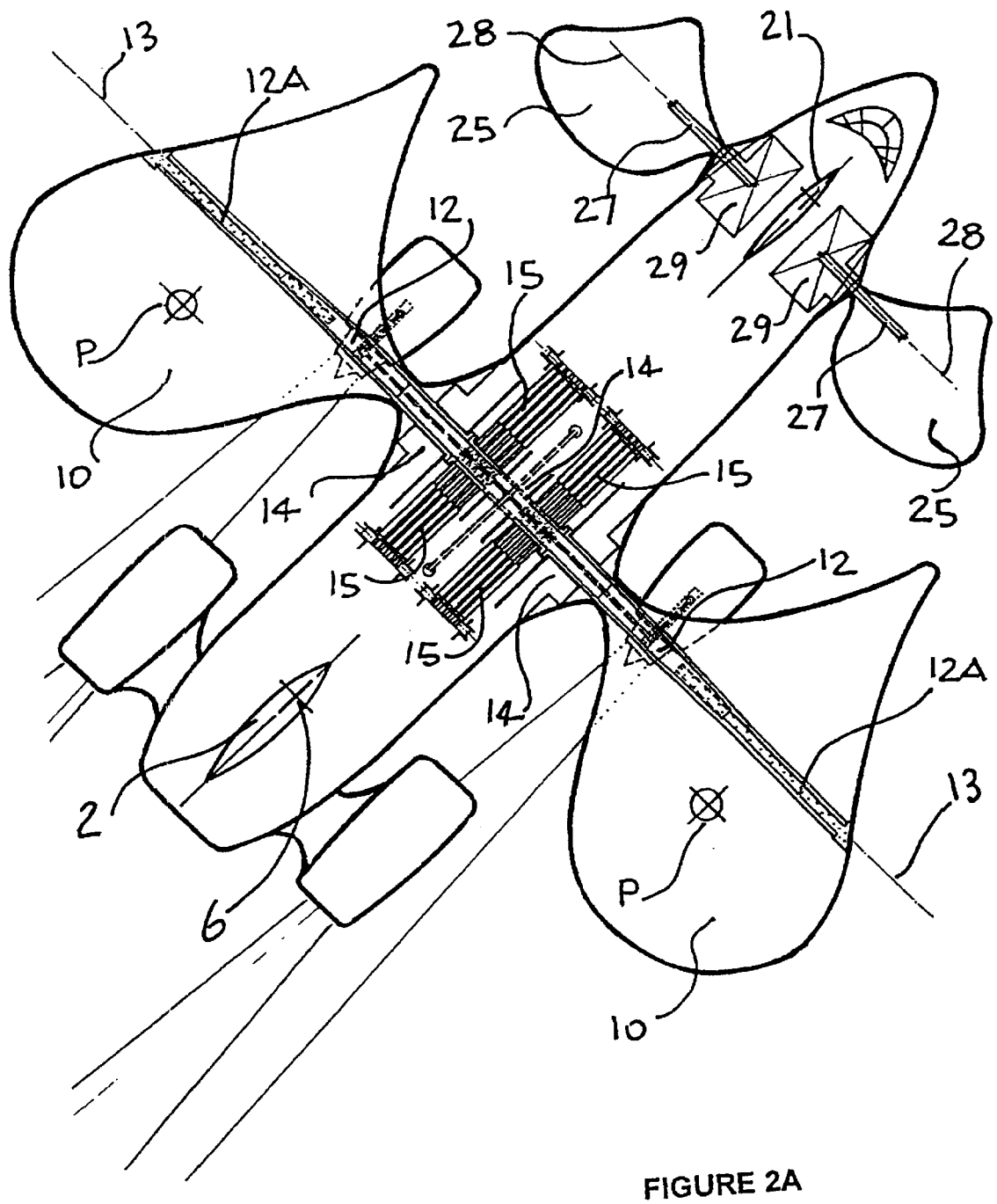
FIG. 2A shows a variation of the arrangement shown in FIG. 2.
Figure 3:
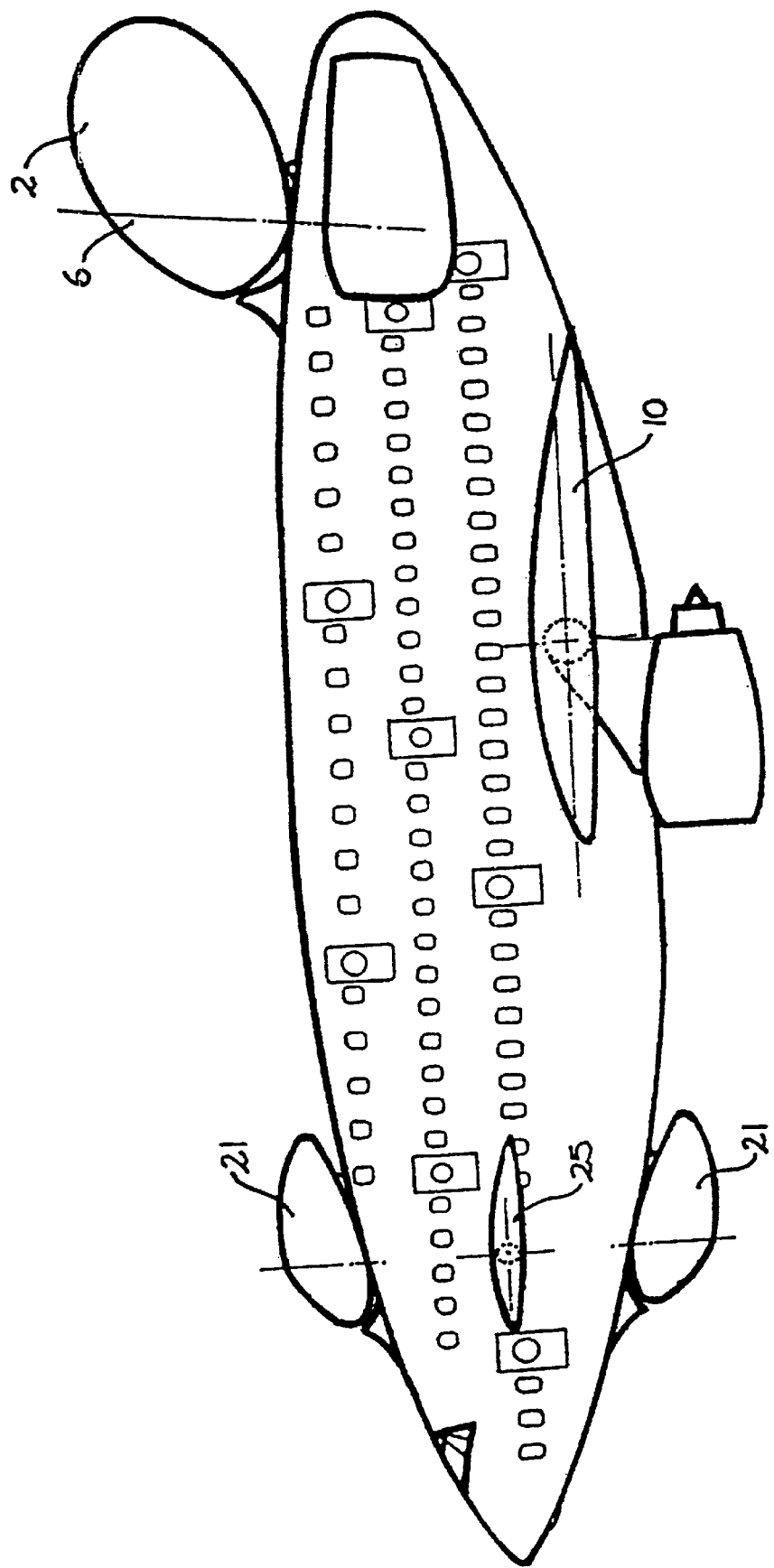
FIG. 3 is a side elevation of the aircraft of FIG. 2A, incorporating the rear fin of FIG. 1, operable in conjunction with upper and lower canard rudder assemblies disposed toward the front of the aircraft.
Figure 4:
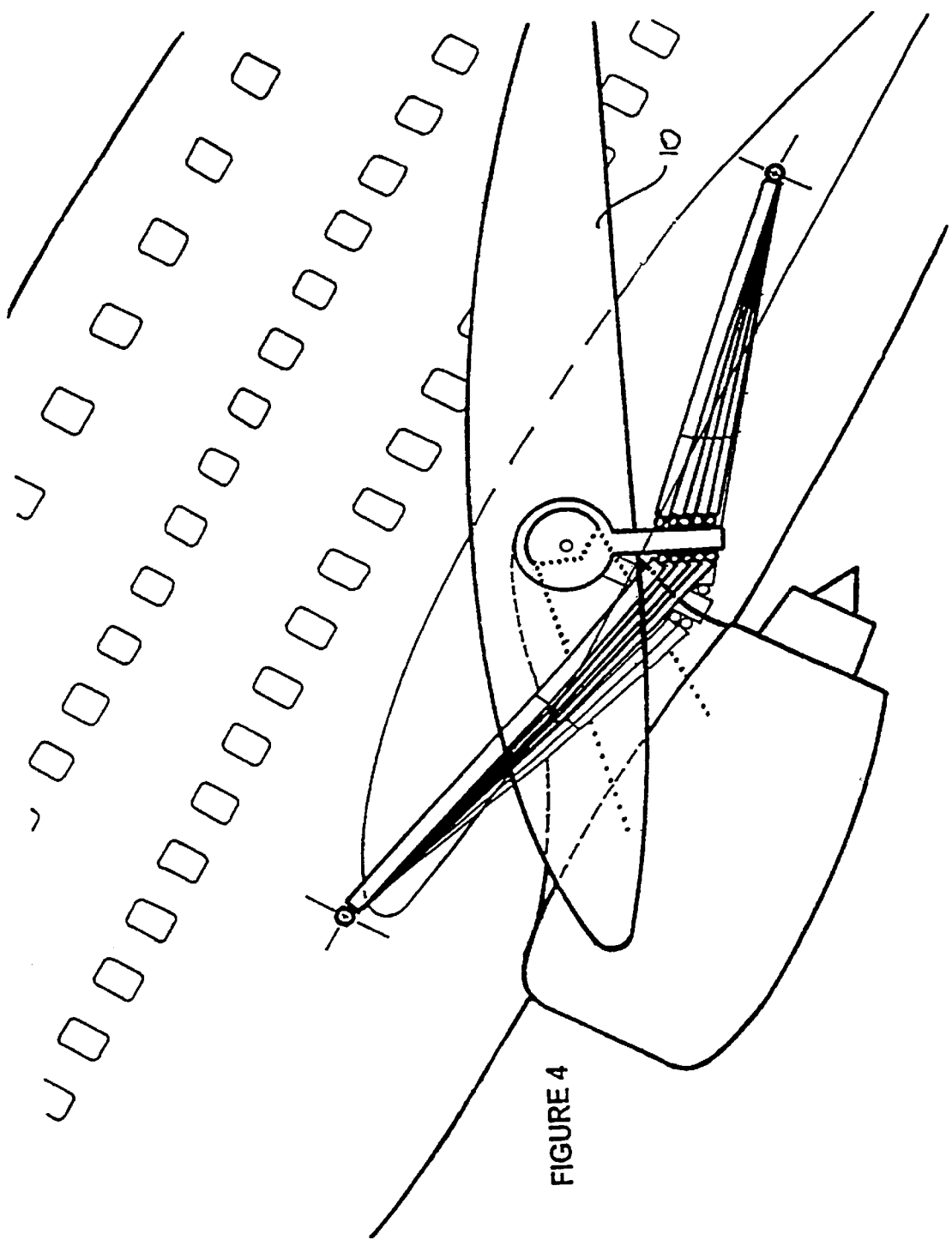
FIG. 4 is an enlarged diagrammatic side elevation of the aircraft of FIGS. 2 and 3, showing the pivotal capability of the primary lift or wing aerofoils.
Figure 5:
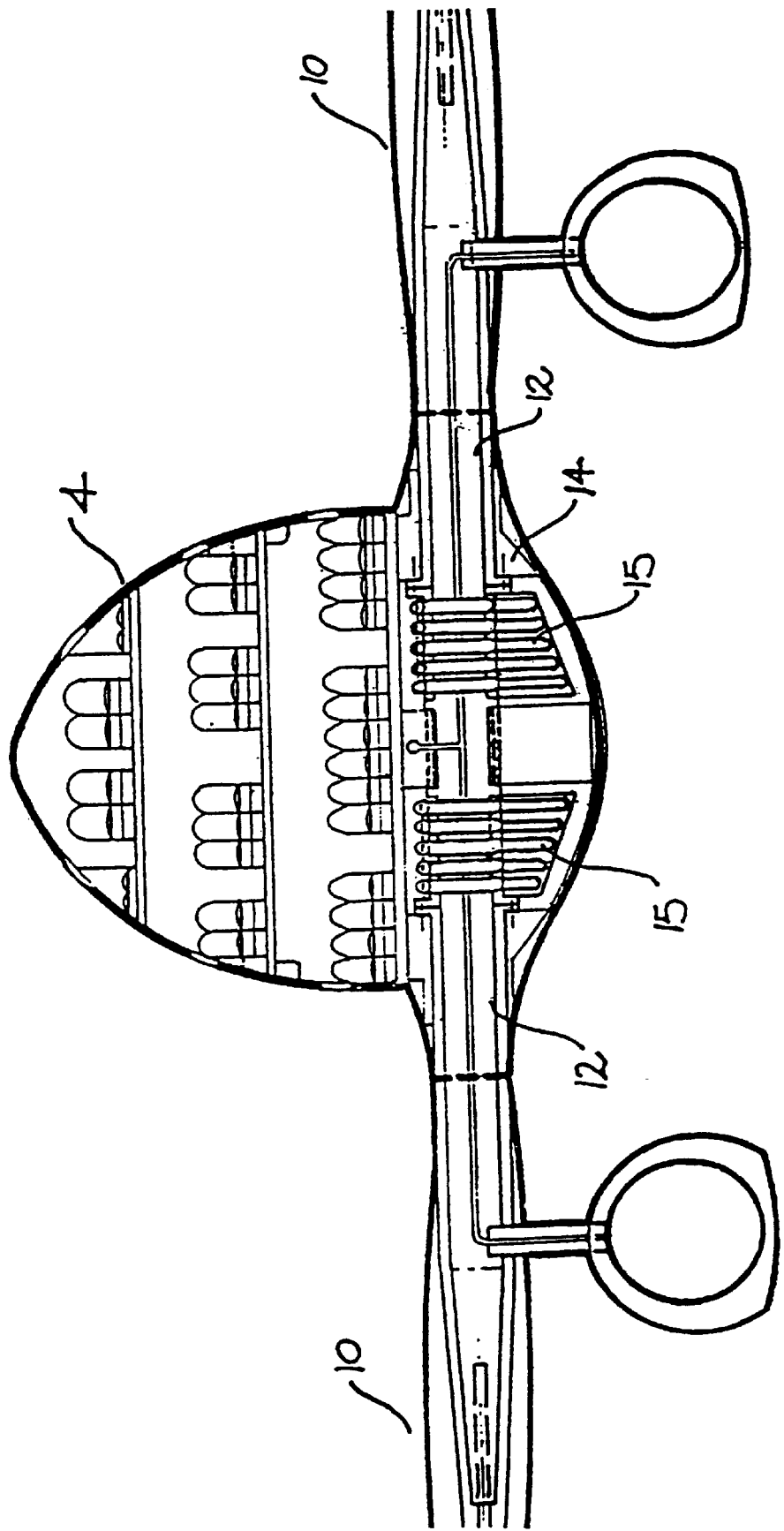
FIG. 5 is a cross-sectional front elevation of the aircraft of FIG. 2 showing the bias control mechanism for the primary wing in more detail.

Turning to FIGS. 2 and 3, it will be seen that the inventive principle has been applied on the horizontal primary aerofoil or wing formations as well as the vertically oriented primary aerofoil or tail fin of an aircraft. In this case, control surfaces 10 according to the invention are formed integrally with the primary lifting aerofoils or wings of the aircraft. Accordingly, they are disposed substantially further forward on the fuselage than the vertical tail control surface 2 of FIG. 1. The horizontally oriented wing formations are rotatably supported by means of their respective static transverse support shafts duly joined as one shaft or a single common one piece, transverse wing shaft 12, also duly located thru the fuselage upon static support shaft bearings 14 thereby supporting both main wings. Each static transverse support shaft 12, either joined together or designed as a whole, unbroken dual-wing shaft clamped through the fuselage, supports a corresponding rotatable axle sleeve 12A, which forms the central part of the primary aerofoil or wings internal formation. In this way, the separate wing formations are able to rotate independently about a common horizontally oriented transverse pivot axis 13. This mounting arrangement enables different sizes or shapes of wings to be interchanged, to optimise performance having regard to variable factors such as payload, intended cruising speed, weather conditions, desired comfort levels, and the like. It is conceivable that an exchange of wings or other control surfaces could be performed as a routine operation, possibly even during a refuelling stop, even acting as a fuel cell which is already fully laden with fuel.

Resilient bias means, in this case shown diagrammatically in the form of two batteries of spring mechanisms 15, each separately operating their respective primary aerofoil, urge the said wing formations toward a central, generally horizontal rest position, in a common plane, while accommodating a limited degree of rotational displacement in response to unbalanced pressure loadings. Once again, the centre of pressure P of each of the main wing surfaces is disposed rearwardly of the axis of rotation 13.

It will be noted that the vertically oriented control surface 2 of the aircraft replaces the conventional tail fin and rudder assembly. However, the aircraft includes a pair of forwardly disposed vertically oriented canard rudders 21 (see FIG. 3), above and below the forward fuselage which replace the conventional rudder role. Similarly, conventional horizontal elevators as shown in FIG. 1 are replaced by a pair of forwardly disposed, relatively smaller, one piece canard wings 25. Each canard wing is independently supported on a shaft 27 for rotation about a horizontal axis 28 and driven by their respective separate motors and individual bearing assemblies 29. Each of the vertically oriented canard rudders are similarly mounted and driven by the same manner.

In this way, it will be appreciated that rotation of the aircraft, in flight, around the pitch axis is regulated primarily by the canard wings 25. Rotation about the yaw axis is controlled primarily by the dual canard rudders 21. Rotation by the aircraft about the roll axis is regulated by rotation of the primary aerofoils or main wing formations, trailing in opposite directions. Preferably, ailerons may be fitted to the wing formations for this purpose if required.

In the embodiment of FIGS. 2 to 5, the wing mounted engines are shown as fixed to the static transverse wing shaft with respect to the fuselage, such that the engine thrust line remains substantially parallel to the longitudinal axis of the aircraft independent of the rotational displacement of the main wing formations. Alternatively, however, in other embodiments the same engines affixed to the fuselage or extensions thereof, could be designed to rotate in concert with the primary wing formations, such that the thrust lines remain substantially parallel to the respective control surfaces. The same engine rotation principle could be applied to vertical primary aerofoil control surfaces embodying the invention, for example aligning with the tail fin.

Figure 7:
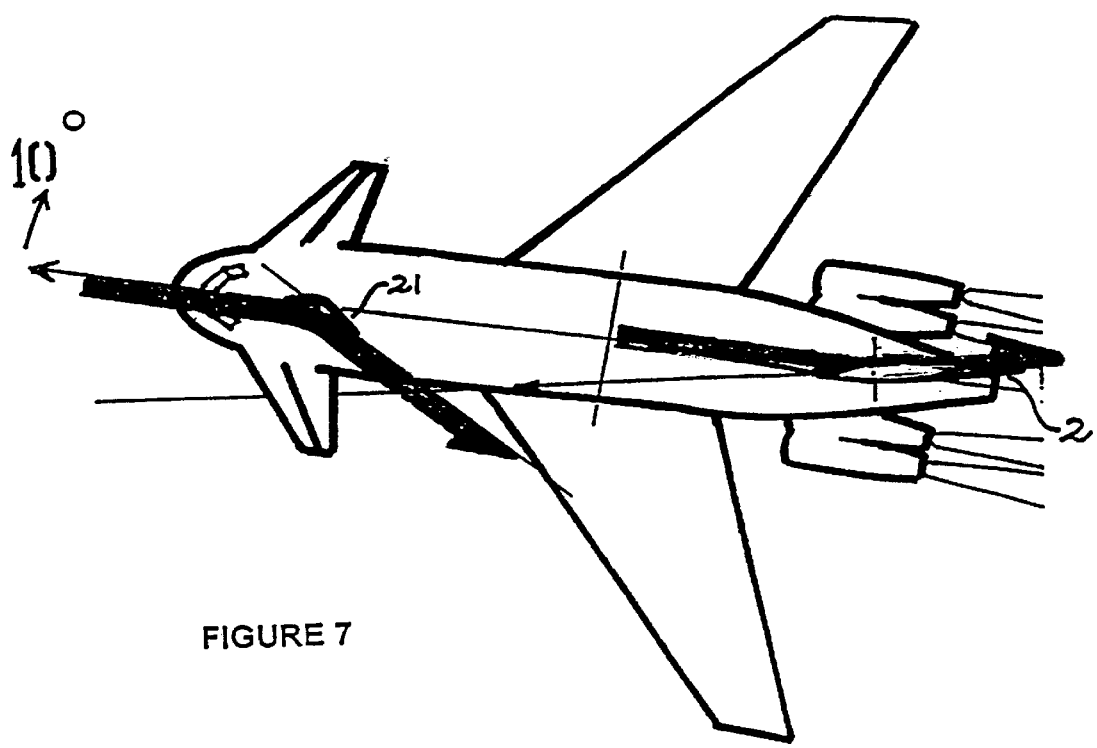
FIG. 7 is a diagrammatic plan view indicating the air flow around the vertical control surfaces at the beginning of a turn.
Figure 6:
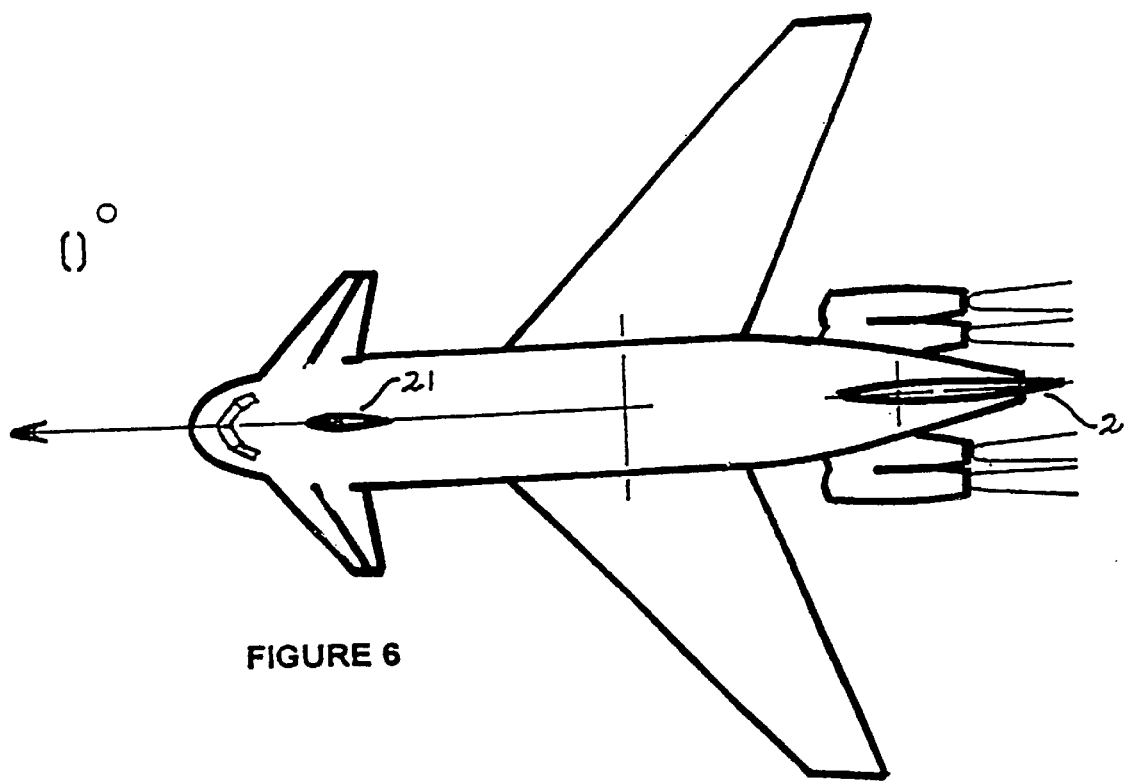
FIG. 6 is a diagrammatic plan view indicating the air flow around the vertical control surfaces before a turn.
Figure 9:
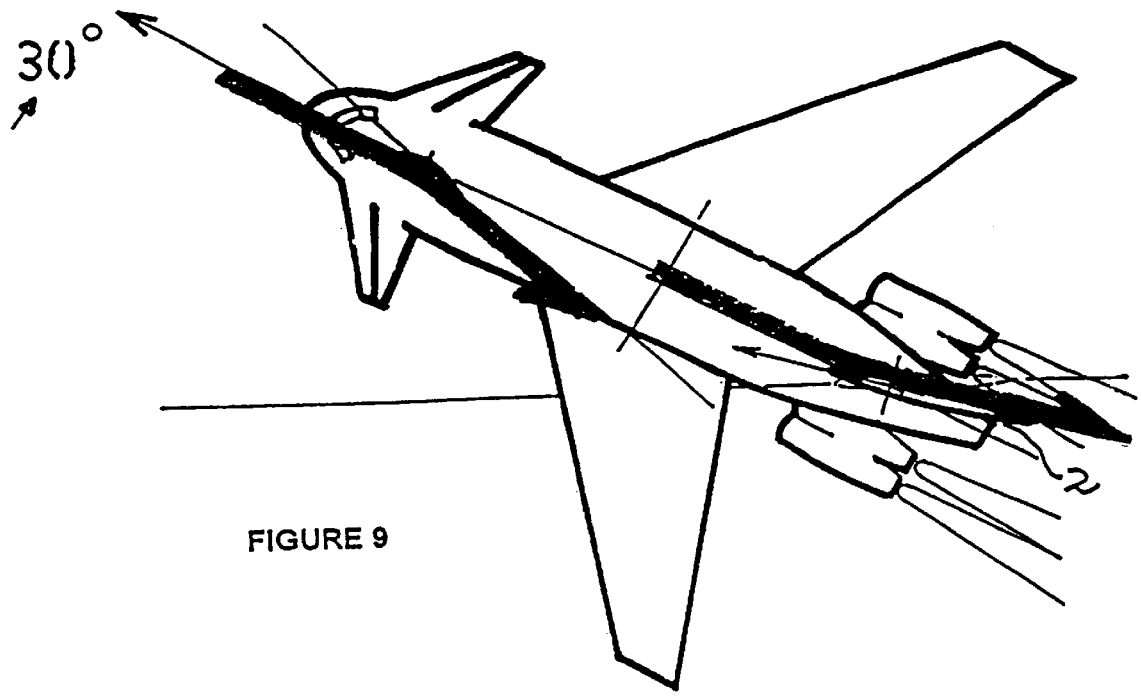
FIG. 9 is a diagrammatic plan view indicating the air flow around the vertical control surfaces during a turn.
Figure 8:
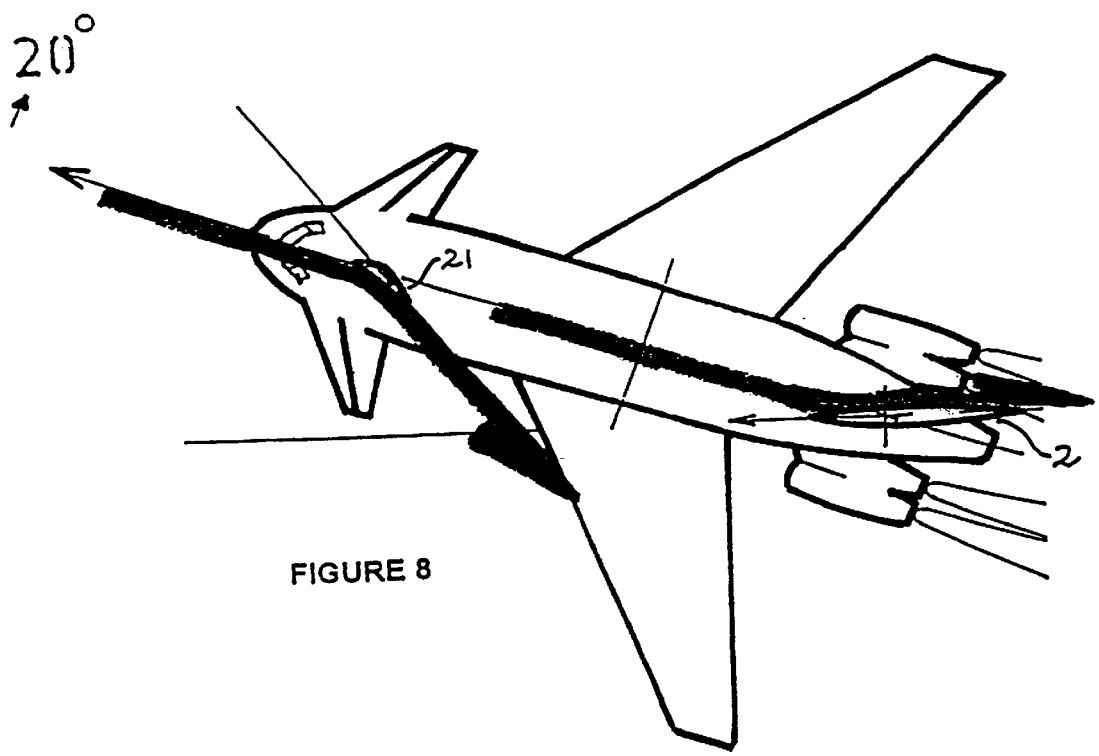
FIG. 8 is a diagrammatic plan view indicating the air flow around the vertical control surfaces during a turn.
Figure 10:
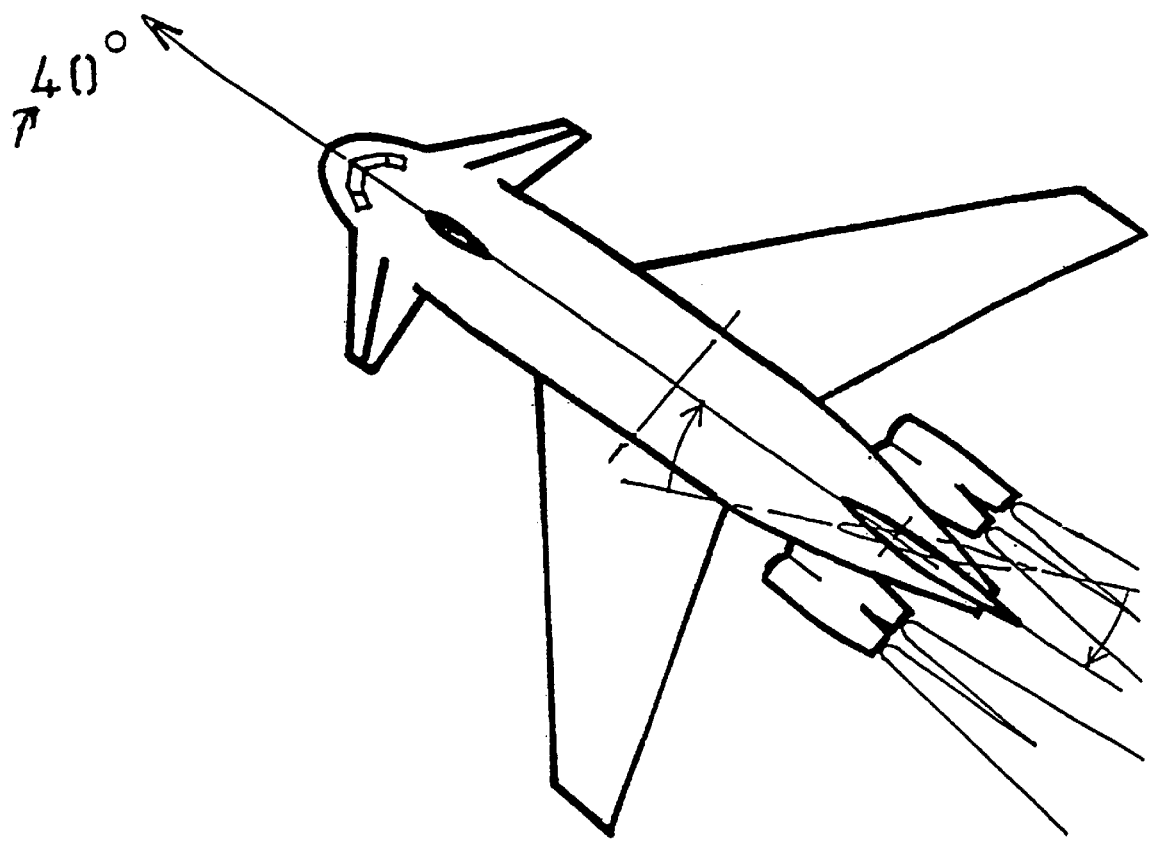
FIG. 10 is a diagrammatic plan view indicating the air flow around the vertical control surfaces at the conclusion of a turn.

Turning now to consider the operation of the control surfaces during various manoeuvres, FIG. 6 is a diagrammatic plan view showing an aircraft according to the invention flying straight ahead, at normal cruising speed, in a steady state of dynamic equilibrium. To initiate a turn to the right, the forward canard rudders 21 are deflected to the left shown in FIG. 7. During this initial phase of the turning manoeuvre, as the aircraft rotates about the vertical yaw axis, the incident air stream causes the vertical control surface of the primary aerofoil 2 to be rotationally displaced in an anticlockwise direction (when viewing the drawings) relative to the longitudinal axis of the fuselage, as shown in FIGS. 8 and 9. The spring bias force tending to restore the control surface 2 to its central rest position is calibrated to maintain an optimum angle of attack with respect to the incident air stream, thereby maintaining the efficiency of the control surface and delaying the onset of a stall condition. Once the new direction of the aircraft begins to be established, the aerofoil of the fin 2 also begins to return to the central rest position as shown in FIG. 9. Finally, FIG. 10 shows the aircraft stabilised after the turn, with the canard rudders straight and the control surface 2 realigned in its rest position.

Figure 13:
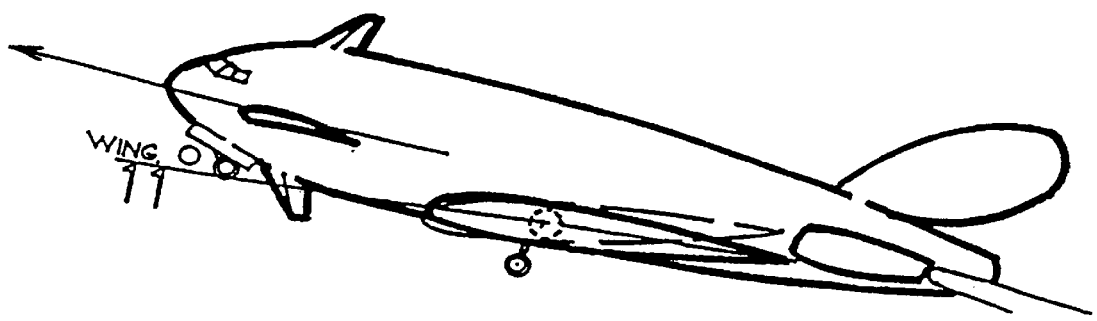
FIG. 13 is a diagrammatic plan view indicating the air flow around the horizontal control surfaces during a change of pitch.
Figure 12:
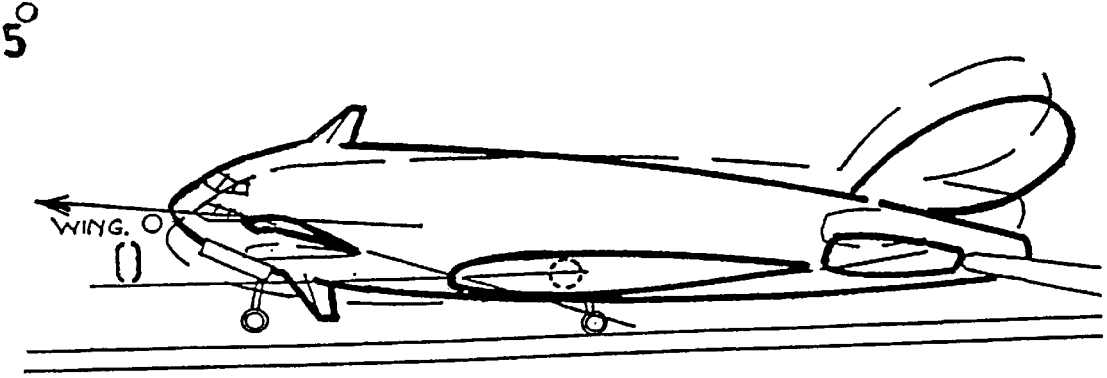
FIG. 12 is a diagrammatic plan view indicating the air flow around the horizontal control surfaces during a change of pitch.
Figure 11:
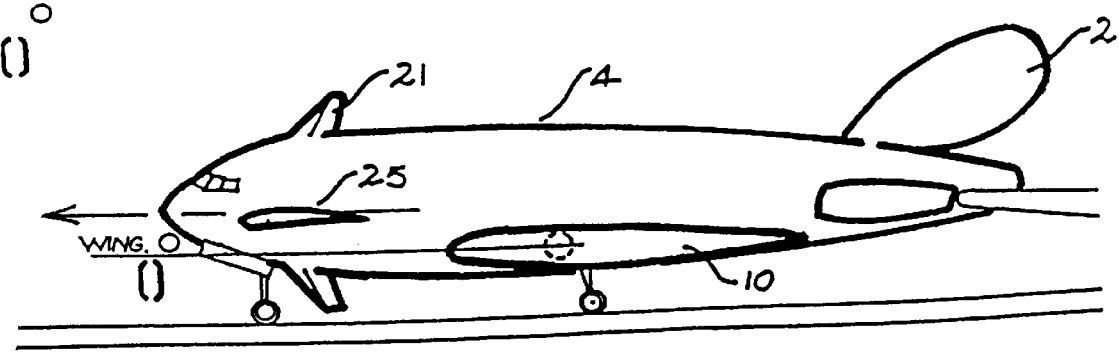
FIG. 11 is a diagrammatic plan view indicating the air flow around the horizontal control surfaces before a change of pitch.
Figure 16:
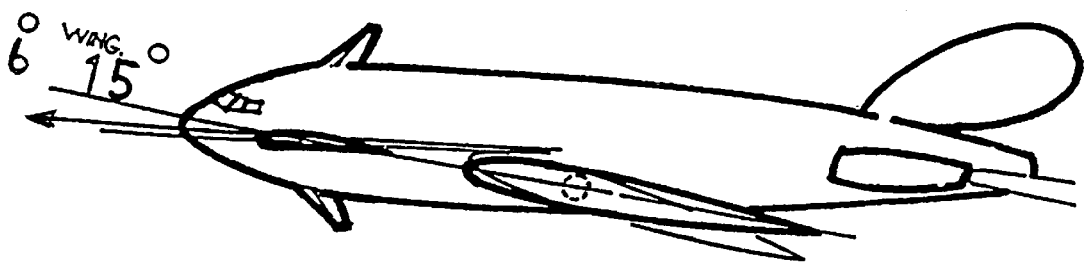
FIG. 16 is a diagrammatic plan view indicating the air flow around the horizontal control surfaces during a change of pitch.
Figure 15:
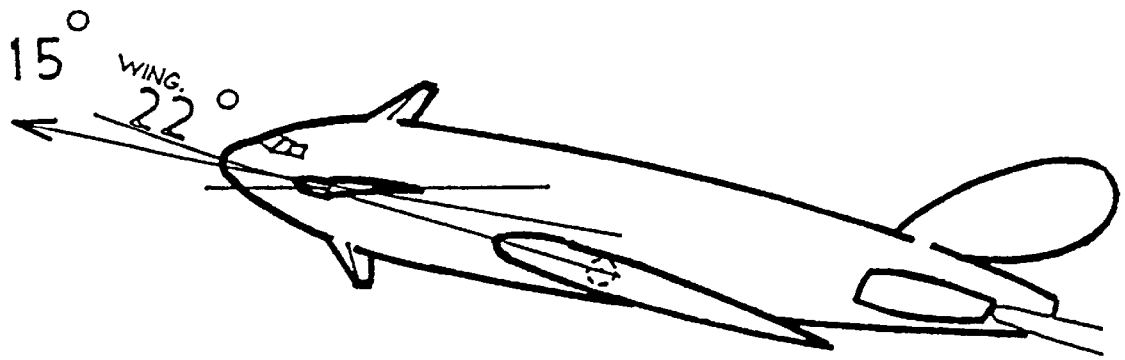
FIG. 15 is a diagrammatic plan view indicating the air flow around the horizontal control surfaces during a change of pitch.
Figure 14:
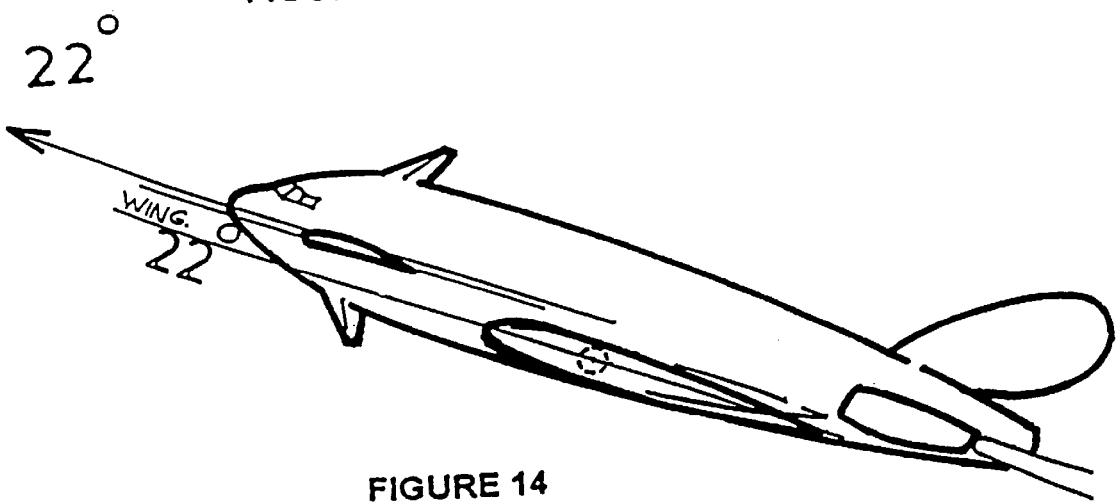
FIG. 14 is a diagrammatic plan view indicating the air flow around the horizontal control surfaces during a change of pitch.
Figure 17:
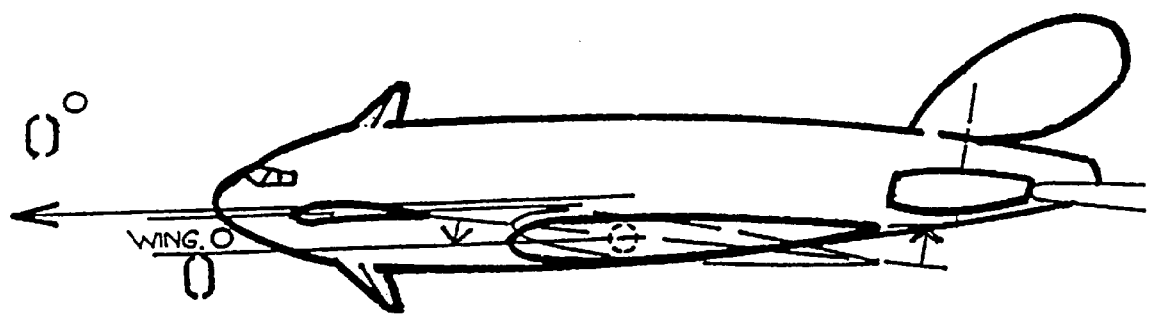
FIG. 17 is a diagrammatic plan view indicating the air flow around the horizontal control surfaces at the conclusion of a change of pitch.

FIGS. 11 to 17 show a similar sequence in side elevation, indicating the movement of the wing formations in response to rotation of the aircraft about the pitch axis, during initial take-off, steady climb, and levelling off manoeuvres. Initially, FIG. 11 shows the aircraft with the primary aerofoils or wing formations 10 aligned with the longitudinal axis of the fuselage, at the commencement of taking-off. With take-off speed attained, as shown in FIG. 12, the forward canard wings 25 are rotated upwardly causing the air deflection to lift the nose. It will be noted, however, that as the nose begins to lift, the differential pressure on the wing surfaces causes the wings to displace in an anti-clockwise direction (when viewing the drawings) relative to the fuselage, rotating against the bias force provided by the internal spring mechanics 15. Once again, the bias force is calibrated to be sufficiently taut to ensure that the wing formations are presented to the incident air stream at an optimum angle of attack. This maximises the lifting efficiency which helps to prevent the onset of a stall condition. As the angle of climb begins to level, as shown in FIGS. 13 and 14, the pressure differential diminishes and the wings progressively return toward the normal rest position, close to the neutral orientation before take-off. As the desired cruising altitude is approached, as shown in FIGS. 15 and 16, the canard wings are deflected downwardly, to cause the aircraft to begin to roll out of the climb, into level flight. During this phase, the wings may become temporarily deflected in the opposite direction to possibly cause an argumentation of lift. Finally as stable, level flight is established the wings once again assume the neutral or rest position generally parallel with the axis of the fuselage, as shown in FIG. 17.

Although various canard aerofoils are shown as incorporating a forward fixed fin or traditional wing section combining a moveable rudder or aileron section respectively, this is essentially for illustrative purposes only. It is envisaged that a fixed section is not required and that in practice this would be integrated with the moveable section as a one piece or whole aerofoil, both for the canard and primary aerofoils, as shown in the more detailed drawings.

Figure 18:
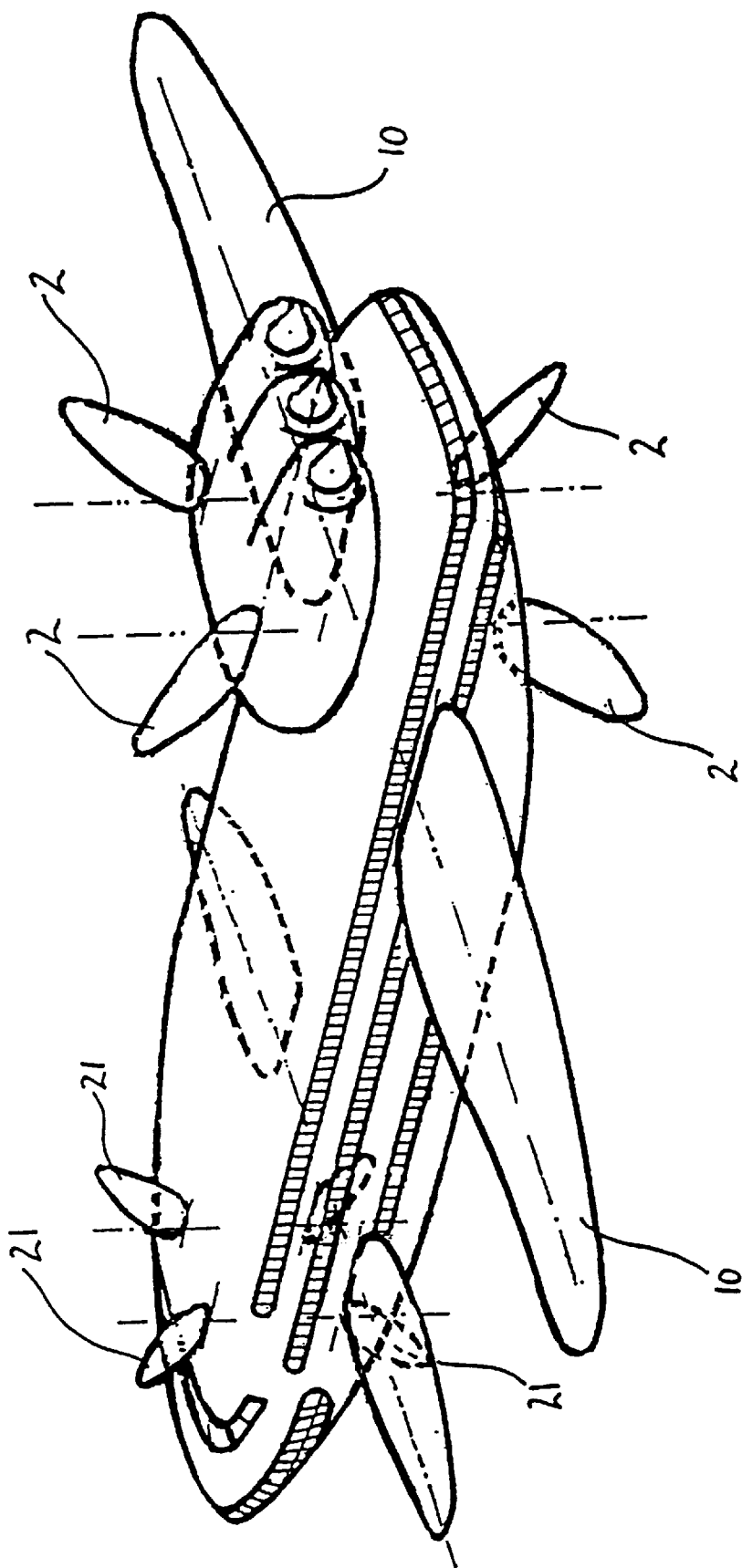
FIG. 18 is a diagrammatic perspective view showing an aircraft according to a further embodiment of the invention, adapted for large scale passenger transportation.
Figure 18A:
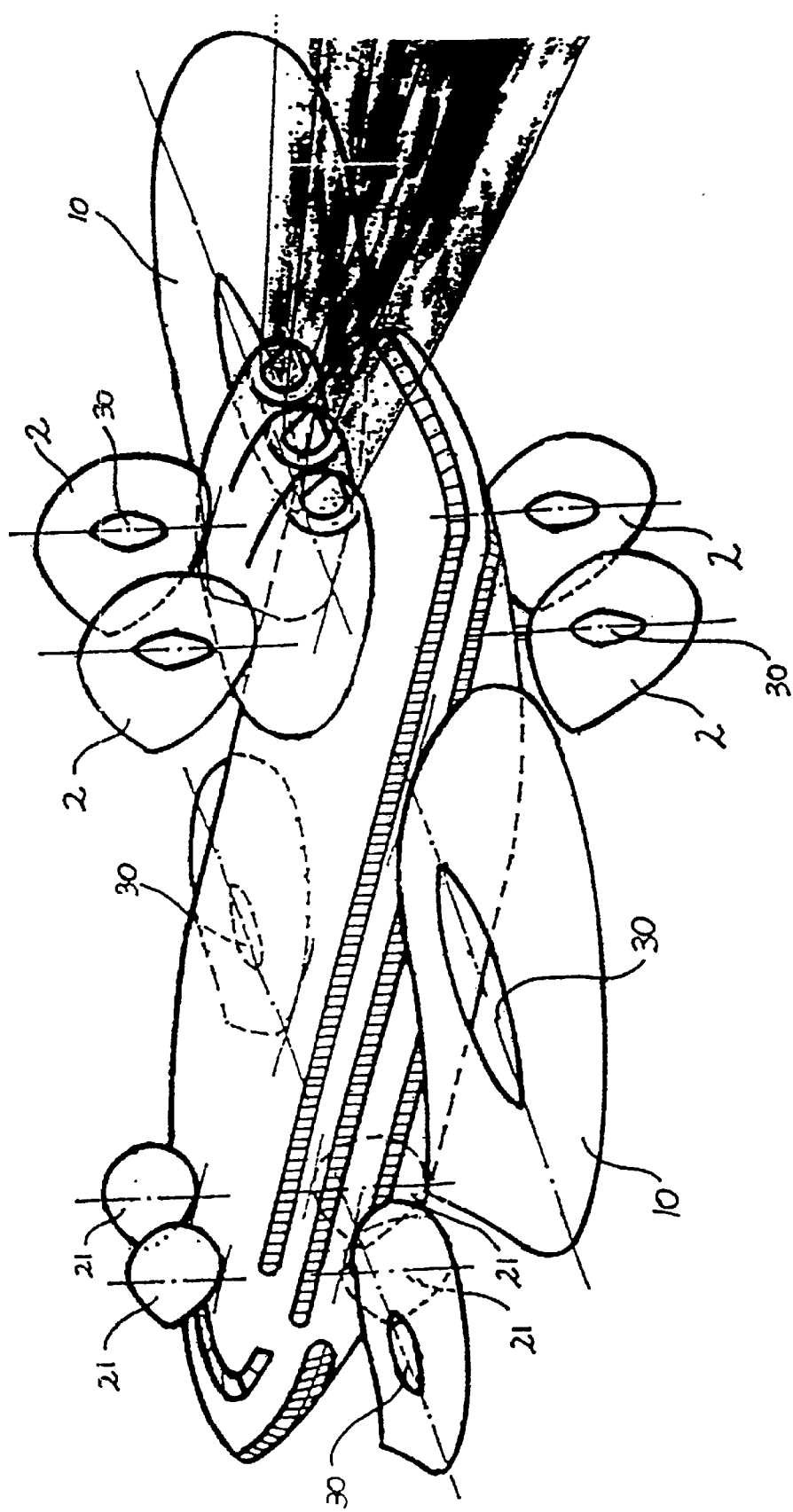
FIG. 18A shows a variation of the arrangement shown in FIG. 18.
Figure 19:
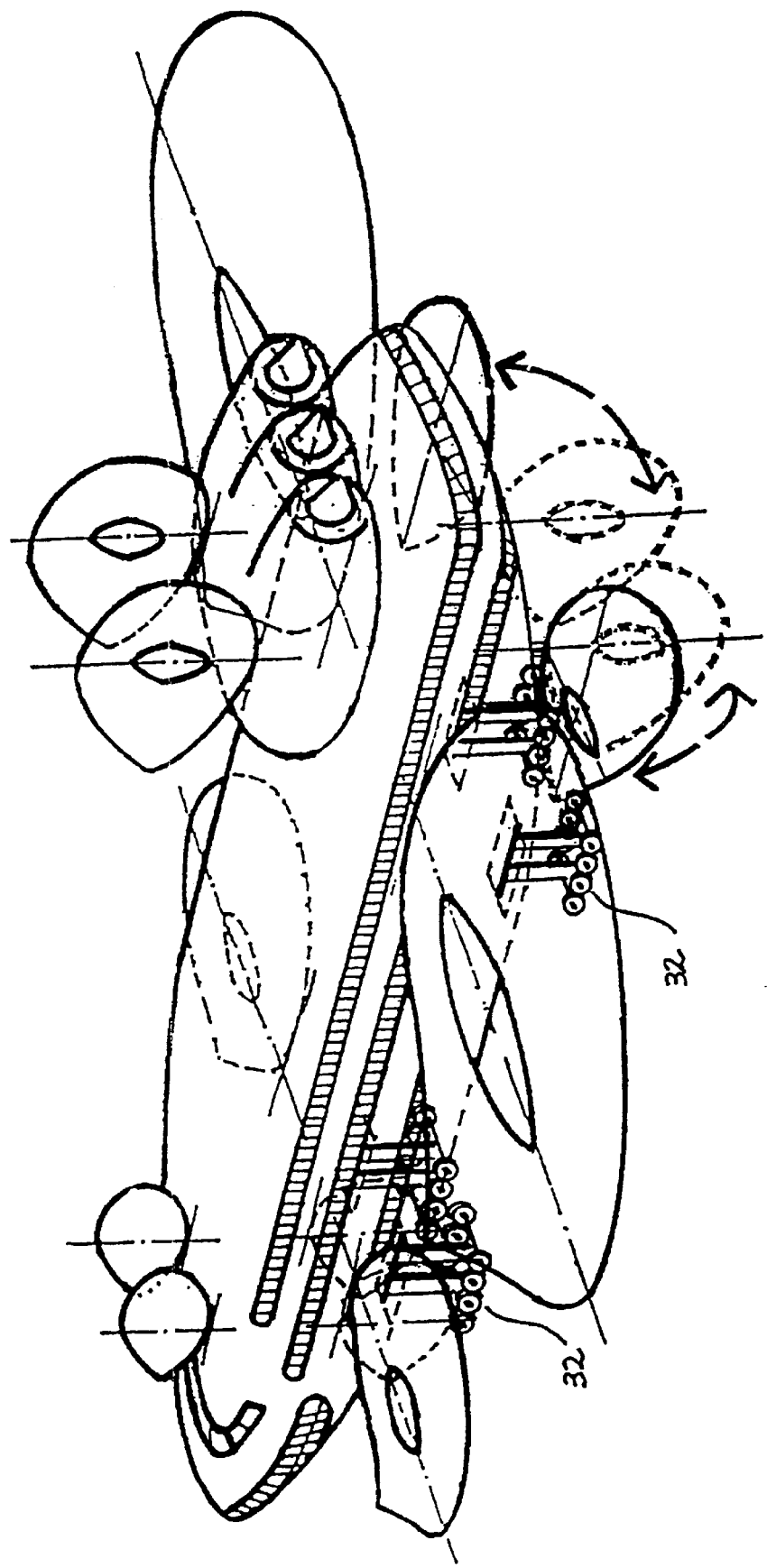
FIG. 19 is a perspective view showing the aircraft of FIG. 18 with the undercarriage deployed, and the lower control surfaces retracted upwardly to provide adequate ground clearance for take-off and landing.

FIGS. 18 to 20 show a third embodiment of the invention, adapted for large scale passenger transportation, wherein corresponding features are denoted by corresponding reference numerals. The principles of operation of the various control surfaces are essentially the same as those described above. In this case, however, it will be seen that the aircraft incorporates respective upper and lower pairs of forward canard rudders 21 and respective upper and lower pairs of rearward, vertical primary aerofoil control surfaces 2. This multiple arrangement including additional vertical primary aerofoil placements enables the size of these control surfaces to be reduced, while maintaining adequate surface area for stable and effective directional control. Importantly, these four pairs of vertically oriented control surfaces define respective control quadrants, within which the individual control surfaces are independently moveable in a complementary manner, to optimise manoeuvrability and turning efficiency. As with the embodiments previously described, the passive fin surfaces 2 may be governed by spring bias means, or alternatively by computer controlled hydraulics or other suitable means. Additional supplementary canard wings, rudders and other control surfaces may also be provided to optimise these particular performance characteristics.

In a preferred embodiment, the primary aerofoil wing formations 10, the canard wings 25, and rearward primary aerofoil control surfaces 2 each incorporate a central aperture or opening 30. These apertures are believed to minimise turbulence, reduce response time to control inputs, and generally enhance manoeuvrability. It will be appreciated that the ratio of the area of the aperture to the overall area of the control surface can be varied so as to optimise particular performance criteria. For example, in passenger aircraft it may be desirable to optimise lift at the expense of manoeuvrability, whereas in military aircraft, it may be preferable to optimise speed and manoeuvrability.

FIG. 19 shows the aircraft of FIG. 18 with undercarriage 32 deployed, ready for landing. In landing mode, the lower vertical control surfaces (both forward and rearward) are retracted upwardly toward the fuselage, to provide adequate ground clearance for take-offs and landing. Once the aircraft is airborne, the landing gear is retracted in conventional manner, and the lower control surfaces are operatively redeployed to the optimum orientation for high speed flight.

Figure 21:
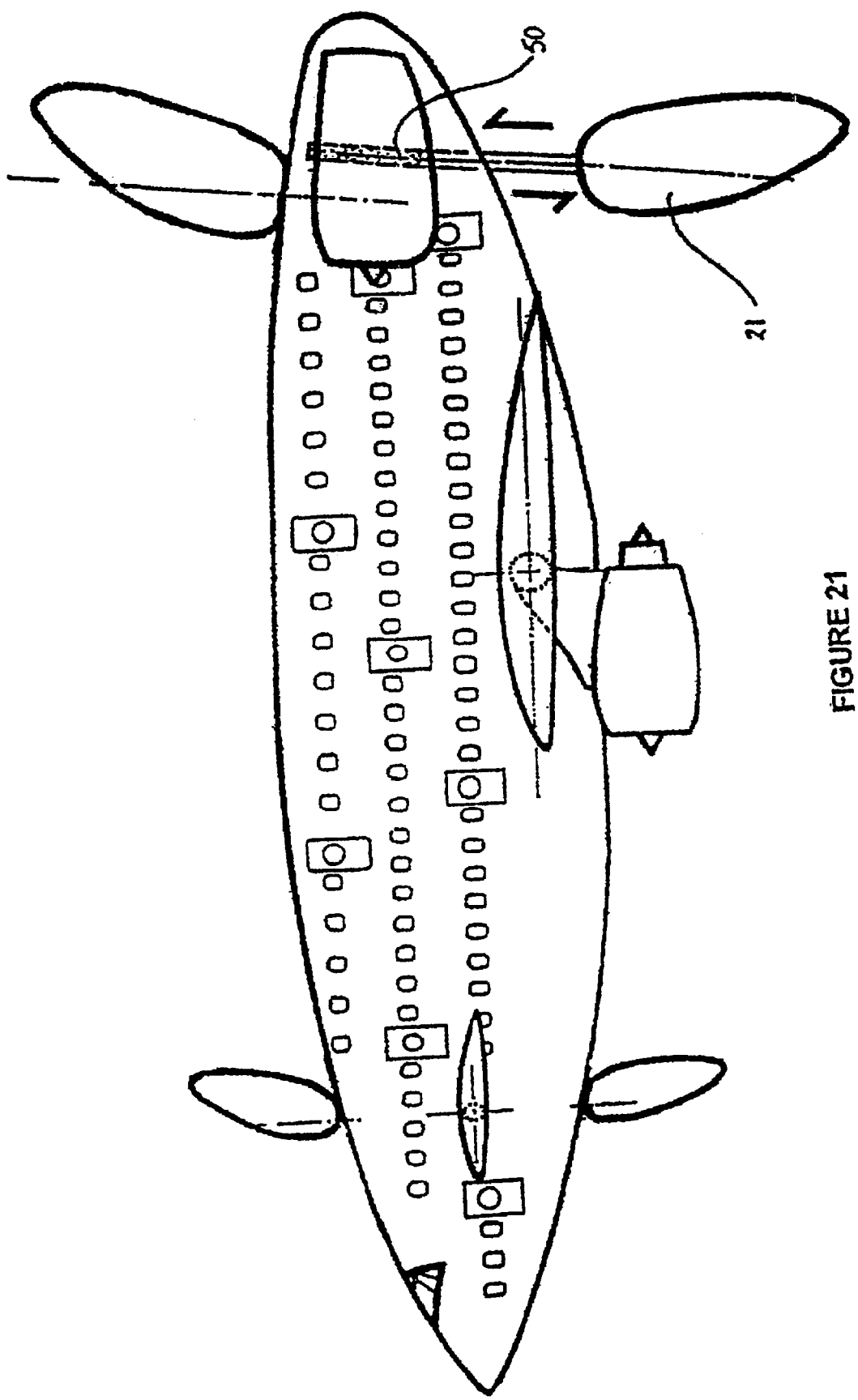
FIG. 21 is essentially a side elevation of the aircraft of FIG. 2 showing a linear retraction mechanism for the lower rearward control surface.

FIG. 20 is an enlarged detail showing one possible mechanism for retraction of those lower vertically oriented aerofoil surfaces. In this case, the control surface 21 is mounted on a shaft adapted for pivotal movement about transverse axis 36. An operable ram 37 (shown in several positions through corresponding numbered rotating sequences, indicating its locus of movement) connects the transverse axis lower section of the pivotal shaft to a distal driven gear 40 by means of a crank sleeve 35. The driven gear 40 is engaged and activated by a driving pinion 41, connected to a suitable drive motor. As the driven gear is rotated in an anti-clockwise direction (when viewing the drawing) the crank sleeve 35 slides downwardly and consequently by the ram retracting drawing the control surface 21 upwardly toward the fuselage, as indicated by upward arrow 45. At the same time, the control surface is pivoted near 90 degrees so as to lie against the underside of the fuselage, as shown. Deployment of the control surface is essentially the reverse of this procedure (whose action is indicated by the downward sequence of arrow 45). A variation of this embodiment is shown in FIG. 20A. In a further embodiment of a lower tail fin shown in FIG. 21, the retraction mechanism makes use of linear hydraulic actuators 50 in place of the rotary crank mechanism.

It is believed that the control surfaces embodying the present invention operate during turning manoeuvres to increase manoeuvrability, augment lift, minimise drag, and optimise turning efficiency. This in turn improves fuel consumption, reduces power consumption, preserves air speed, and conserves the momentum of the aircraft. Perhaps most significantly, the invention delays the onset of stall conditions which could otherwise result in a dramatic reduction in the efficiency and effectiveness of the control surface, as well as associated lifting surfaces. In these respects, the invention represents a functional and commercially significant improvement over the prior art.

Although the invention has been described with reference to specific examples, it will be appreciated by those skilled in the art that the invention may be embodied in many other forms. In particular, it should be noted that the principle may be applied to any primary aerofoil surface of an aircraft which include the tail fins, rudders, tail planes, elevators, wings, ailerons and flaps, whether disposed forwardly or rearwardly in relation to each other whether oriented vertically, horizontally or at any intermediate angle. It should also be appreciated that the desired biasing forces need not be provided by resilient means in the conventional sense, but could be regulated by more complex hydraulic, pneumatic, electrical, or mechanical actuators, with their control algorithms tailored to the desired performance characteristics of the aircraft.

What is claimed is:

1. An aircraft, comprising:

a canard control surface and an aft control surface;

the canard control surface comprising an integral aerofoil which in its entirety pivots about a first axis of rotation, the canard control surface having a centre of lift which is rearward of the first axis;

the aft control surface being rearward of the canard control surface and comprising an integral aerofoil which in its entirety pivots about a second axis of rotation, the aft control surface having a center of lift which is rearward of the first axis;

the canard control surface and the aft control surface acting in unison to produce a directional change in the aircraft;

the canard control surface and the aft control surface being both generally horizontally oriented and acting in unison by rotating in different directions;

the aft control surface comprising the primary lifting wings of the aircraft, the wings each being independently rotatable about the second axis.

2. The aircraft of claim 1, wherein:

the second axis comprises an unbroken dual-wing shaft forming a common pivot axis for each wing.

3. The aircraft of claim 1, wherein:

the primary lifting wings are interchangeable with similar wings or wings of a different size or shape.

4. The aircraft of claim 1, wherein:

one or each wing may serve as a fuel cell laden with fuel.

5. The aircraft of claim 1, wherein:

at least one control surface further comprises a bias mechanism which permits a limited degree of rotational movement away from a central rest position but which imposes a restorative force toward the central rest position.

6. The aircraft of claim 2, wherein:

at least one control surface further comprises a bias mechanism which permits a limited degree of rotational movement away from a central rest position but which imposes a restorative force toward the central rest position.

7. The aircraft of claim 3, wherein:

at least one control surface further comprises a bias mechanism which permits a limited degree of rotational movement away from a central rest position but which imposes a restorative force toward the central rest position.

8. The aircraft of claim 4, wherein:

at least one control surface further comprises a bias mechanism which permits a limited degree of rotational movement away from a central rest position but which imposes a restorative force toward the central rest position.

* * * * *